(12) United States Patent
Hong

(10) Patent No.: US 9,413,870 B2
(45) Date of Patent: Aug. 9, 2016

(54) TERMINAL CAPABLE OF CONTROLLING ATTRIBUTE OF APPLICATION BASED ON MOTION AND METHOD THEREOF

(75) Inventor: Hyun-Su Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 13/604,541

(22) Filed: Sep. 5, 2012

(65) Prior Publication Data

US 2013/0067422 A1    Mar. 14, 2013

(30) Foreign Application Priority Data

Sep. 5, 2011    (KR) ........................ 10-2011-0089563

(51) Int. Cl.
| | |
|---|---|
| *G06F 3/033* | (2013.01) |
| *H04M 1/725* | (2006.01) |
| *G06F 3/0346* | (2013.01) |
| *G06F 3/01* | (2006.01) |
| *G06F 3/0488* | (2013.01) |

(Continued)

(52) U.S. Cl.
CPC ........... *H04M 1/72522* (2013.01); *G06F 3/017* (2013.01); *G06F 3/0346* (2013.01); *G06F 3/0481* (2013.01); *G06F 3/0482* (2013.01); *G06F 3/0488* (2013.01); *G06F 3/04883* (2013.01); *H04M 1/72544* (2013.01); *H04M 1/72558* (2013.01); *H04M 2250/12* (2013.01); *H04M 2250/22* (2013.01)

(58) Field of Classification Search
USPC .................................. 715/863, 864; 345/173
See application file for complete search history.

(56) References Cited

U.S. PATENT DOCUMENTS

| | | | |
|---|---|---|---|
| 2005/0210419 A1 | 9/2005 | Kela et al. | |
| 2006/0017692 A1* | 1/2006 | Wehrenberg et al. | ......... 345/156 |
| 2009/0235192 A1* | 9/2009 | De Haan et al. | .............. 715/764 |

(Continued)

FOREIGN PATENT DOCUMENTS

| | | |
|---|---|---|
| EP | 2161645 A2 | 3/2010 |
| KR | 10-0646347 | 11/2006 |

(Continued)

OTHER PUBLICATIONS

Jensen RS, Motion Bar for Controlling Events within Multimedia Applications, Nov. 1, 1993; IP.com Prior Art Database Technical Disclosure, pp. 71-72.*

(Continued)

*Primary Examiner* — Linh K Pham
*Assistant Examiner* — Tam Tran

(57) ABSTRACT

A terminal controls an application attribute based on a motion. The terminal includes a motion measurement unit, an attribute mapping unit, an attribute control unit, and a controller. The motion measurement unit measures a motion of the terminal. The attribute mapping unit classifies motion directions of the terminal, classifies a motion degree, and maps an attribute type and a control strength of an application installed in the terminal in response to each motion direction and each motion degree. The attribute control unit activates an attribute control of the application based on a motion of the terminal. When the attribute control of the application is activated by the attribute control unit and the motion of the terminal is measured by the motion measurement unit, the controller controls an attribute of the application based on the attribute type and the control strength mapped by the attribute mapping unit.

26 Claims, 6 Drawing Sheets

(51) Int. Cl.
*G06F 3/0481* (2013.01)
*G06F 3/0482* (2013.01)

(56) References Cited

U.S. PATENT DOCUMENTS

| | | |
|---|---|---|
| 2009/0265671 A1 | 10/2009 | Sachs et al. |
| 2012/0086629 A1* | 4/2012 | Thorn ............................ 345/156 |
| 2012/0151415 A1* | 6/2012 | Park et al. ..................... 715/835 |
| 2012/0185798 A1* | 7/2012 | Louch et al. .................. 715/796 |
| 2012/0218177 A1* | 8/2012 | Pang ..................... G06F 3/0346 345/156 |
| 2012/0229411 A1* | 9/2012 | Arai .............................. 345/173 |

FOREIGN PATENT DOCUMENTS

| | | |
|---|---|---|
| KR | 10-2011-0058182 | 6/2011 |
| WO | WO 2005/093550 A2 | 10/2005 |
| WO | WO 2011025239 A2 * | 3/2011 |

OTHER PUBLICATIONS

Powell et al., Audio Level Control for Self-Service Computer Terminals, Aug. 1, 1990; IP.com Prior Art Database Technical Disclosure, pp. 248-250.*

European Examination Report dated Sep. 24, 2013 in connection with European Patent Application No. 12183215.8, 6 pages.

Extended European Search Report dated Jan. 24, 2013 in connection with European Patent Application No. 12183215.8.

Communication Pursuant to Article 94(3) EPC dated Oct. 8, 2015 in connection with European Patent Application No. 12183215.8; 7 pages.

Summons to Attend Oral Proceedings Pursuant to Rule 115(1) EPC dated Mar. 31, 2015 in connection with European Patent Application No. 12183215.8; 7 pages.

* cited by examiner

TERMINAL CAPABLE OF CONTROLLING ATTRIBUTE OF APPLICATION BASED ON MOTION AND METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 5, 2011 and assigned Serial No. 10-2011-0089563, the entire disclosure of which is hereby incorporated by reference.

TECHNICAL FIELD OF THE INVENTION

The present disclosure relates to a terminal capable of controlling an attribute of an application based on a motion, and a method thereof.

BACKGROUND OF THE INVENTION

Recently, as a mobile communication terminal takes a seat as a necessity of a modern people, various additional functions are added to the mobile communication terminal. For example, the mobile communication terminal allows a user to view a stored moving picture or a television (TV), or listen to music, linguistic study, etc. while the user is moving besides a simple voice communication function of the mobile communication terminal by installing an application such as a video player, an audio player, etc. to the mobile communication terminal. Alternatively, the mobile communication terminal allows a user to play a game using the mobile communication terminal while the user is moving by installing a game application to the mobile communication terminal.

In most of applications, a user controls an attribute of the application using an input key provided to the mobile communication terminal or an input means displayed on the screen of a touchscreen. For example, in case of a video player or an audio player, the user may forward or backward a reproduction point by pressing a left/right direction key, and control the size of the volume by pressing an up/down direction key. Alternatively, with respect to a video player or an audio player displayed on the screen of the touchscreen, the user may control a reproduction point or the size of the volume by dragging a reproduction scroll bar or a volume scroll bar while touching the same.

Meanwhile, recently, a study for increasing user convenience of a mobile communication terminal by mounting a motion measure sensor such as a gyroscope to a mobile communication terminal, and using the mounted motion measure sensor is in progress.

SUMMARY OF THE INVENTION

To address the above-discussed deficiencies of the prior art, it is a primary object to provide at least the advantages described below. Accordingly, an aspect of the present disclosure is to provide a terminal for mounting a motion measure sensor, and controlling an attribute of an application installed in the terminal based on motion information of the terminal measured by the mounted motion measure sensor, and a method thereof.

In accordance with an aspect of the present disclosure, a terminal capable of controlling an application attribute is provided. The terminal includes a motion measurement unit for measuring a motion of the terminal, an attribute mapping unit for classifying motion directions of the terminal, classifying step by step a motion degree for at least one of a velocity in each motion direction, an acceleration, an angular velocity, an angular acceleration, an amount of change in a slope, and an amount of change in a movement distance, and mapping an attribute type and a control strength of an application installed in the terminal in response to each motion direction and each motion degree, an attribute control unit for activating an attribute control of the application based on a motion of the terminal, and a controller for, when the attribute control of the application is activated by the attribute control unit and the motion of the terminal is measured by the motion measurement unit, controlling an attribute of the application based on the attribute type and the control strength mapped by the attribute mapping unit in response to the measured motion.

The terminal capable of controlling the application attribute may further include an application selector for selecting an application to execute among a plurality of applications installed in the terminal.

The attribute mapping unit may map an attribute type including at least one of forward, backward, play, pause, and volume based on a motion direction of the terminal with respect to at least one of a video player and an audio player.

The attribute mapping unit may classify step by step a range regarding at least one of a velocity in each motion direction, an acceleration, an angular velocity, an angular acceleration, an amount of change in a slope, and an amount of change in a movement distance, and map a control strength including at least one of a movement interval, a reproduction position, a volume level, and a forward/backward playing of a video player or an audio player in response to each classified range.

The attribute mapping unit may map an attribute type including at least one of direction change, an acceleration, reduce speed in response to a motion direction of the terminal, and map a control strength regarding direction change, an acceleration, and reduce speed in response to at least one of a velocity in a relevant motion direction, an acceleration, an angular velocity, an angular acceleration, an amount of change in a slope, and an amount of change in a movement distance with respect to a racing game application.

In accordance with another aspect of the present disclosure, a method for controlling an application attribute is provided. The method includes classifying a motion direction of a terminal, classifying step by step a motion degree for at least one of a velocity in the motion direction, an acceleration, an angular velocity, an angular acceleration, an amount of change in a slope, and an amount of change in a movement distance, and mapping an attribute type and a control strength of an application installed in the terminal in response to each motion direction and each motion degree, activating an attribute control of the application, measuring a motion of the terminal, and controlling the attribute of the application based on the attribute type and the control strength mapped in response to the measured motion.

The method for controlling the application attribute may further include selecting an application to execute among a plurality of application installed in the terminal.

The mapping may include mapping an attribute type including at least one of forward, backward, play, pause, and volume based on the motion direction of the terminal with respect to at least one of a video player and an audio player.

The mapping may include classifying step by step a range regarding at least one of a velocity in each motion direction, an acceleration, an angular velocity, an angular acceleration, an amount of change in a slope, and an amount of change in a movement distance, and mapping a control strength including at least one of a movement interval (e.g., play speed), a reproduction position (e.g., a bookmark), a volume level, and a forward/backward playing of a video player or an audio player in response to each classified range.

The mapping may include mapping an attribute type including at least one of direction change, an acceleration, reduce speed in response to a motion direction of the terminal, and mapping a control strength regarding direction change, an acceleration, and reduce speed in response to at least one of a velocity in a relevant motion direction, an acceleration, an angular velocity, an angular acceleration, an amount of change in a slope, and an amount of change in a movement distance with respect to a racing game application.

In accordance with still another aspect of the present disclosure, a method for controlling an application attribute is provided. The method includes detecting a contact on a touch detect display while an electronic device having the touch detect display executes a relevant application, when the detected contact corresponds to an application attribute, detecting a motion of the electronic device, and controlling the application attribute in response to the detected motion.

In accordance with further another aspect of the present disclosure, an electronic device is provided. The electronic device includes a touch detect display, one or more processors, a memory, and one or more programs stored in the memory and configured for execution by the one or more processors, wherein the program includes commands for detecting a contact on the touch detect display while the electronic device having the touch detect display executes a relevant application, when the detected contact corresponds to an application attribute, detecting a motion of the electronic device, and controlling the application attribute in response to the detected motion.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged terminal or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the invention as defined by the appended claims and their equivalents.

The present disclosure relates to a terminal for mounting a motion measure sensor, and controlling an attribute of an application installed in the terminal based on motion information of the terminal measured by the mounted motion measure sensor, and a method thereof.

Figure 1:
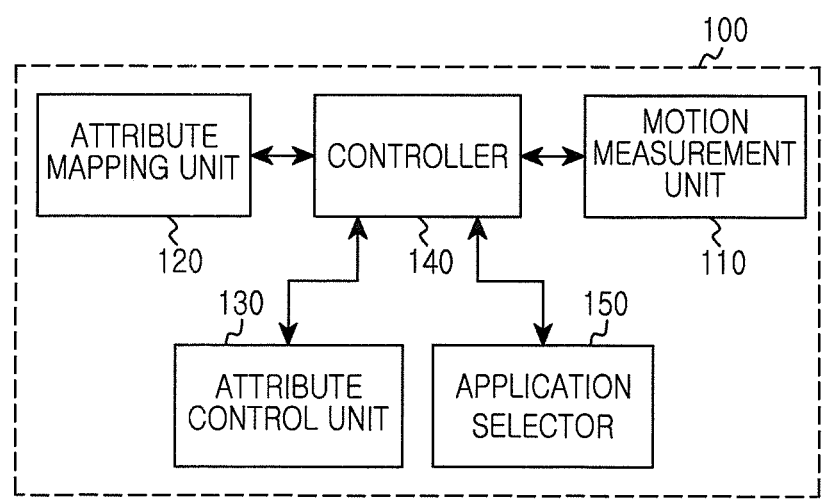
FIG. 1 illustrates a block diagram of a terminal capable of controlling an application attribute based on a motion according to an exemplary embodiment of the present disclosure.

FIG. 1 illustrates a block diagram of a terminal capable of controlling an application attribute based on a motion according to an exemplary embodiment of the present disclosure.

The terminal may be an electronic device such as, for example, a laptop, a smart phone, a net book, a mobile internet device, an ultra mobile PC, a tablet personal computer, a mobile telecommunication terminal, PDA having a camera and the like herein, just to name some of the possibilities.

Referring to FIG. 1, the terminal may include a motion measurement unit 110, an attribute mapping unit 120, an attribute control unit 130, a controller 140, and an application selector 150. Here, the terminal 100 may include not only a Personal Digital Assistant (PDA), a cellular phone, a smart phone, a notebook, a tablet, etc. classified for each terminal type, and a mobile communication terminal such as a Personal Communication Service (PCS) phone, a Global System for Mobile communications (GSM) phone, a Wideband Code Division Multiple Access (W-CDMA) phone, a CDMA-2000 phone, a Mobile Broadband System (MBS) phone, etc. classified for each communication scheme, but also a mobile terminal such as an MP3 player, a Portable Multimedia Player (PMP), a Play Station Portable (PSP), etc. that can reproduce a moving picture or sound or install an application such as games and thus can produce moving pictures or sound or execute an application such as Games.

The motion measurement unit 110, the attribute mapping unit 120, the attribute control unit 130, the controller 140, and the application selector 150 may be separate elements or may be integrated in one or more integrated circuits. Particularly, the motion measurement unit 110, the attribute mapping unit 120, the attribute control unit 130 and the application selector 150 may be embodied as a software module.

The motion measurement unit 110 may measure a motion of the terminal 100 using a motion measure sensor such as a slope sensor, a gravity sensor, a velocity sensor, an acceleration sensor, an angular velocity sensor, a gyro sensor, etc. The motion measuring method using the motion measure sensor uses the known method, and detailed description thereof is omitted.

Figure 2:
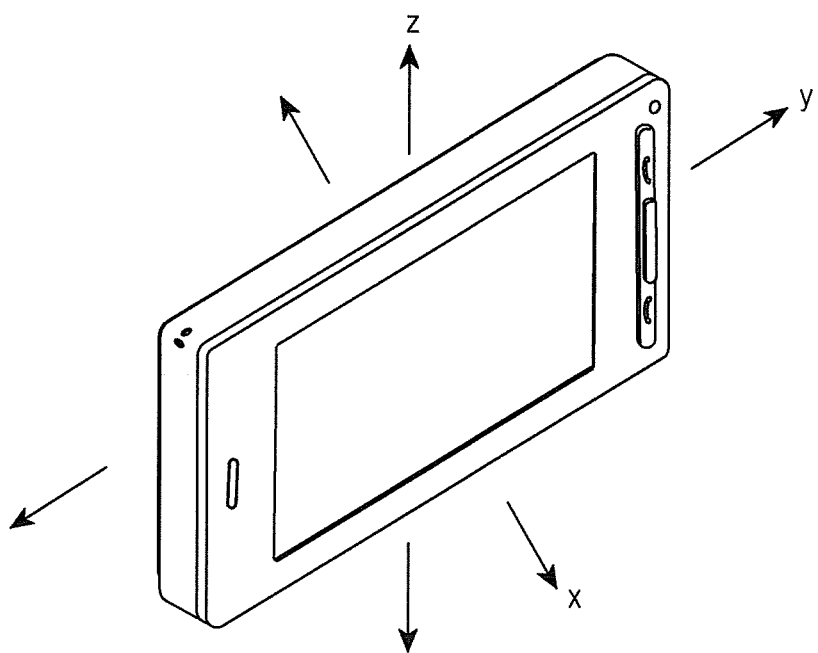
FIG. 2 illustrates an example of a motion direction and a motion degree of a terminal in accordance with various embodiments of the present disclosure.

The attribute mapping unit 120 may classify a motion direction of the terminal, classify step by step a motion degree for at least one of a velocity, an acceleration, an angular velocity, an angular acceleration, an amount of change in a slope, and an amount of change in a movement distance in each motion direction, and map an attribute type and a control strength of an application installed in the terminal in response to each motion direction and each motion degree. At this point, the attribute mapping unit 120 may map attribute types such as forward, backward, play, pause, volume, etc. based on the motion direction of the terminal 100 with respect to an application such as a video player, an audio player, etc. In addition, the attribute mapping unit 120 may classify step by step a range for at least one of a velocity, an acceleration, an angular velocity, an angular acceleration, an amount of change in a slope, and an amount of change in a movement distance in each motion direction, and map a control strength including at least one of a movement interval, a reproduction position, a volume level, and forward/backward playing of a video player or an audio player in response to each classified range. For example, as illustrated in FIG. 2, a user may move the terminal 100 an x-axis direction of back and forth direction, a y-axis direction of left and right direction, or a z-axis direction of up and down direction with respect to a screen. The attribute mapping unit 120 may classify the motion direction of the terminal into the six directions, and classify a velocity into three motion degrees including step 1 of 0-0.5 m/s, step 2 of 0.5-1 m/s, and step 3 of more than 1 m/s with respect to each motion direction. In this example, the attribute mapping unit may map a forward attribute to the right motion direction of the terminal, and map a backward attribute to the left motion direction with respect to an application of a video player. At this point, the attribute mapping unit may map the control strength of forward or backward to forward or backward to an image before/after 10 seconds and reproduce the same in the example where a velocity is step 1 with respect to the right motion direction or the left motion direction, to forward or backward to an image before/after 30 seconds and reproduce the same in the example where a velocity is step 2, and to forward or backward to an image before/after 1 minute and reproduce the same in the example where a velocity is step 3. In addition, it is possible to set a repetitive time interval of forward and backward, and allow forward and backward to be performed repeatedly with the set time interval in the example where a motion of a constant velocity in the left/right direction lasts.

In addition, a volume attribute may be mapped to an up/down motion direction of the terminal. At this point, the attribute mapping unit 120 may perform mapping such that the volume is up or down by step 1 with respect to the control strength of the volume level classified into a plurality of steps in the example where a velocity is step 1 with respect to an upper motion direction or a lower motion direction, perform mapping such that the volume is up or down by step 2 in the example where the velocity is step 2, and perform mapping such that the volume is up or down by step 3 in the example where the velocity is step 3. In addition, it is possible to set a repetitive time interval of volume up or down, and allow the volume up or down to be performed repeatedly with the set time interval in the example where a motion of a constant velocity in the up/down direction lasts.

In addition, a pause attribute may be mapped to a backward motion of the terminal, and a reproduction attribute may be mapped to a forward motion of the terminal. In this example, the pause or reproduction may be executed only when a velocity in back/forth direction is a set value or more.

Figure 3:
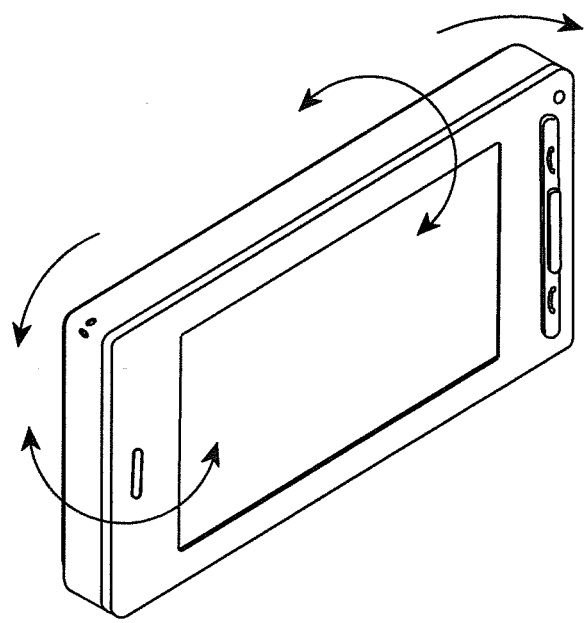
FIG. 3 illustrates another example of a motion direction and a motion degree of a terminal in accordance with various embodiments of the present disclosure.

A motion degree for the velocity of the terminal described here is only an example, and the motion degree may be classified into various steps with respect to an acceleration, an angular velocity, an angular acceleration, a slope, a movement distance, etc. In addition, mapping of the attribute type and control strength of an application to the motion direction and motion degree of the terminal is only an example, and the attribute type and control strength of the application may be mapped in various methods. Also, the motion direction and the motion degree illustrated in FIG. 2 are only examples, and are not limited thereto and may be classified using various methods. For example, as illustrated in FIG. 3, the motion direction of the terminal may be classified into a left rotation direction and a right rotation direction around x-axis with respect to the back/forth direction of the terminal, classified into a left rotation direction and a right rotation direction around y-axis with respect to the left/right direction of the terminal, and classified into a left rotation direction and a right rotation direction around z-axis with respect to the up/down direction of the terminal. Accordingly, a motion degree with respect to each rotation direction may be classified according to a rotation angle or an angular velocity. The attribute type and control strength of the application may be mapped to each classified rotation direction and motion degree as described above.

Figure 4:
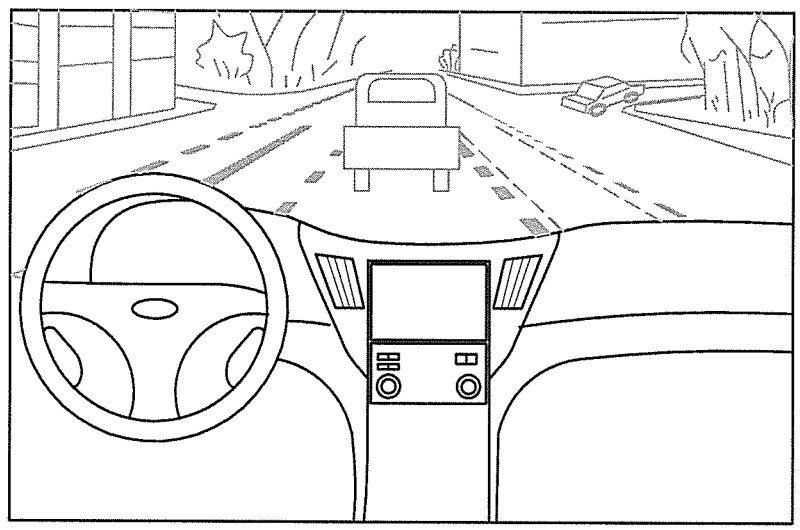
FIG. 4 illustrates an example of controlling an application attribute applied to a racing game in accordance with various embodiments of the present disclosure.

The attribute mapping unit 120 may map an attribute type such as direction change, acceleration, reduce speed, etc. for an application such as a racing game, and map control strength for direction change, acceleration, reduce speed, etc. based on a velocity, an acceleration, an angular velocity, an angular acceleration, an amount of change in a slope, an amount of change in a movement distance, etc. in each motion direction using a rotation motion of the terminal 100. For example, as illustrated in FIG. 4, the attribute mapping unit 120 may perform mapping such that the front image of the car is switched and displayed in the left/right direction when an image of a car driver's seat and a front distance is displayed on the screen of the terminal, and the slope of the terminal is changed to the left direction or right direction around x-axis with respect to the back/forth direction similar to rotating a handle of the driver's seat image in left/right direction. At this point, the attribute mapping unit 120 may map the control strength such that a direction switch degree is displayed in proportion to an amount of change in a slope of the left/right direction of the terminal. In addition, the attribute mapping unit 120 may map the control strength such that a velocity increases or decreases as the slope changes to the forward direction or backward direction around y-axis with respect to the left/right direction of the terminal. In this example, it is preferable that a degree of increasing or decreasing the velocity is mapped in proportion to an amount of change in a slope within a range of the slope allowing a user to view the screen of the terminal continuously.

The motion direction and the motion degree of the terminal may be classified in combination by combining the example embodiments of FIG. 2 with the example embodiments of FIG. 3. That is, the motion direction and the motion degree may be classified according to an example where the terminal rotates around each axis of FIG. 3 while moving each direction of FIG. 2, and the attribute type and control strength of an application may be mapped in response to each classified motion direction and motion degree.

Figure 5:
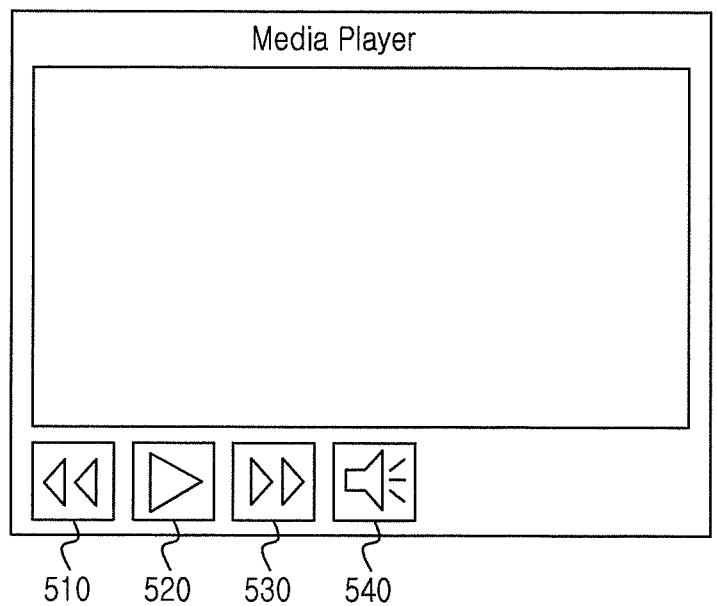
FIG. 5 illustrates an example of attribute control activation of an application in accordance with various embodiments of the present disclosure.

The attribute control unit 130 activates an attribute control of an application based on the motion of the terminal. At this point, the attribute control unit 130 may be a specific key designated among input keys provided to the terminal 100, or a specific point set on a touchscreen. For example, when a media player such as a video player, an audio player, etc. is executed, points for selecting attributes such as backward 510, play 520, forward 530, and volume 540 may be displayed on the lower end thereof as illustrated in FIG. 5. When a user touches a desired attribute select point or presses the desired attribute select point for a set time or more continuously, the attribute control unit 130 may activate the attribute control of a relevant application based on the motion of the terminal. Here, though FIG. 5 illustrates that various attribute select points based on an application are displayed on the screen, one attribute select point may be displayed on the screen and attributes may sequentially change based on the user's touch frequency or the user's operation of moving the terminal while pressing the attribute select point.

When the user selects the attribute control unit 130, the controller 140 recognizes that an attribute control for an application installed in the terminal is executed, and receives a motion value measured by the motion measurement unit 110. At this point, the motion value received from the motion measurement unit 110 may be at least one of a motion direction, a velocity, an acceleration, an angular velocity, an angular acceleration, an amount of change in a slope, and an amount of change in a movement distance. The controller 140 retrieves an attribute type and a control strength mapped by the attribute mapping unit 120 in response to the motion value of the terminal received from the motion measurement unit 110, and controls the attribute of the application based on the retrieved attributed type and control strength.

The application selector 150 may select an application to currently execute among a plurality of applications installed in the terminal 100. At this point, the application selector 150 may be a specific key designated among a plurality of input keys provided to the terminal 100, or a specific point set on a touchscreen as in the example of the attribute control unit 130. In addition, the application selector 150 is set using the same key as the attribute control unit 130, and may be discriminated by an input frequency or a pressing time. For example, when a user presses a designated input key or a touch point for less than a set time, the controller 140 may recognize the relevant input key or the relevant touch point as the application selector 150, and sequentially display applications installed in the terminal 100 on the screen. In addition, when the user presses the designated input key or touch point for the set time or more continuously with respect to the application displayed on the screen, the controller 140 may recognize the relevant input key or the relevant touch point as the attribute control unit 130 and receive a motion value of the terminal 100 from the motion measurement unit 110. Alternatively, the application selector 150 may be mapped to one of the classified motion direction and motion degree of the terminal 100. For example, when the user rotates the terminal 100 backward at a rotation angular velocity of more than a set value around y-axis with respect to the left/right direction of the terminal 100, the controller 140 may recognize that an application select command via the application selector 150 has been input and sequentially display applications on the screen.

Though not shown, the terminal may further include a touch detect display as a user interface. The user interface is intended for mediating an interaction between a user and an electronic device. The user interface is used for various electronic devices including a mobile electronic device. In addition, a Graphic User Interface (GUI) is generally used.

A touchscreen detects a contact on the touchscreen and reacts to the contact thereof. This touchscreen displays text and graphic. The touchscreen may display one or more soft keys, a menu, or other user interface objects.

A user may touch the touchscreen to interact with an electronic device. That is, the user touches the touchscreen at a position corresponding to an object of the touchscreen where the user intends to interact with the electronic device, thereby interacting with the electronic device.

Figure 6:
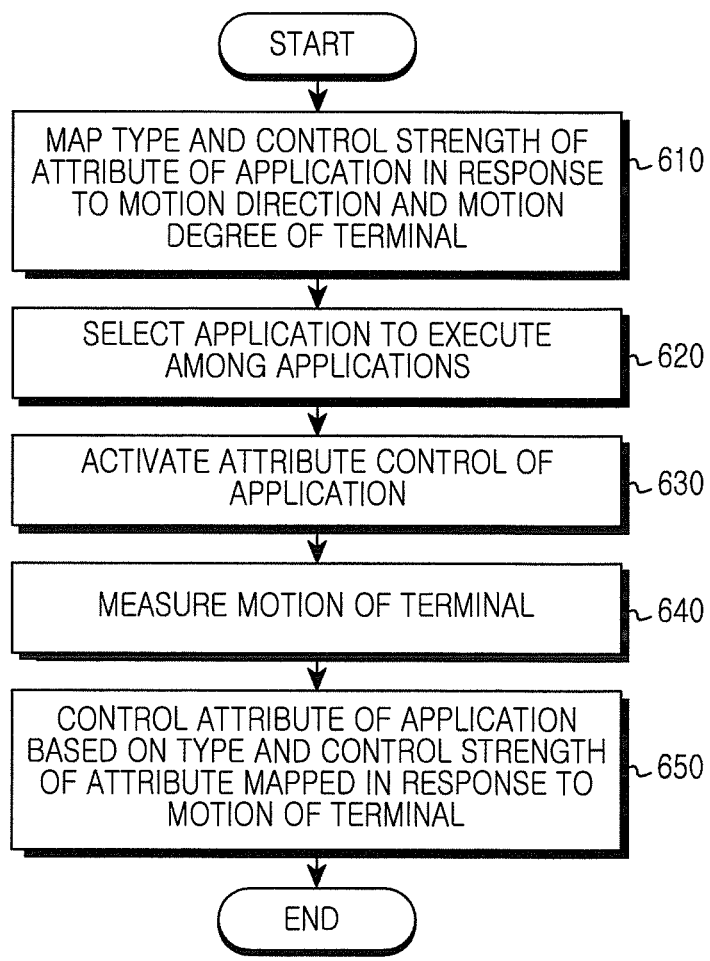
FIG. 6 illustrates an application attribute control method according to an exemplary embodiment of the present disclosure.

FIG. 6 illustrates an application attribute control method according to an exemplary embodiment of the present disclosure.

Referring to FIGS. 1 and 6, the attribute mapping unit 120 may classify a motion direction of a terminal, classify step by step a motion degree for at least one of a velocity, an acceleration, an angular velocity, an angular acceleration, an amount of change in a slope, and an amount of change in a movement distance in each motion direction, and map an attribute type and a control strength of an application installed in the terminal in response to each motion direction and motion degree (610). At this point, the attribute mapping unit 120 may map the attribute type such as forward, backward, play, pause, volume, etc. based on the motion direction of the terminal 100 with respect to an application such as a video player, an audio player, etc. In addition, the attribute mapping unit 120 may classify step by step a range regarding at least one of a velocity, an acceleration, an angular velocity, an angular acceleration, an amount of change in a slope, and an amount of change in a movement distance in each motion direction in each motion direction, and map a control strength including at least one of a movement interval, a reproduction position, a volume level, and a forward/backward playing of a video player or an audio player in response to the classified each range.

The application selector 150 may select an application to currently execute among a plurality of applications installed in the terminal 100 (620). At this point, the application selector 150 may be a designated specific key among a plurality of input keys provided to the terminal 100 or a specific point set on the touchscreen. In addition, the application selector 150 may be set using the same key as the attribute control unit 130, and discriminated by an input frequency or a pressing time.

The attribute control unit 130 activates an attribute control of an application based on the motion of the terminal 100 (630). At this point, the attribute control unit 130 may be a designated specific key among the plurality of input keys provided to the terminal 100 or a specific point set on the touchscreen. In the example where the attribute control unit 130 is displayed as a specific point on the touchscreen, the attribute control unit 130 may be displayed as a point corresponding to a type of the attribute of a relevant application, and may be displayed as one point, and may be realized such that types of the attribute are sequentially switched based on a user's touch frequency or a touch and the motion of the terminal. At this point, selection of an attribute desired by the user may be also set using various methods based on a combination of a touch of the attribute control unit 130 and the motion of the terminal.

When the user moves the terminal 100 while selecting the attribute control unit 130, the motion measurement unit 110 measures a motion direction and a motion degree of the terminal 100 using the motion measure sensor of the terminal 100 (640). At this point, by selection of the attribute control unit 130, the controller 140 recognizes that an attribute control for an application installed in the terminal is executed, and receives a motion value measured by the motion measurement unit 110. In this example, a motion value received from the motion measurement unit 110 may be at least one of a motion direction, a velocity, an acceleration, an angular velocity, an angular acceleration, an amount of change in a slope, and an amount of change in a movement distance.

The controller 140 retrieves an attribute type and a control strength mapped by the attribute mapping unit 120 in response to a motion value of the terminal received from the motion measurement unit 110, and controls the attribute of an application based on the retrieved attribute type and control strength, thereby controlling the attribute of the application based on the motion of the terminal 100 (650).

The methods according to the embodiments described in claims and/or specification of the present disclosure may be implemented in the form of hardware, software, or a combination of hardware and software.

When implementing the various embodiments of the present disclosure in the form of software, a computer-readable storage medium that stores one or more programs (software module) may be provided. One or more programs stored in the computer-readable storage medium are configured for execution by one or more processors inside an electronic device. One or more programs include instructions for allowing the electronic device to execute methods according to the embodiments described in claims and/or the specification of the present disclosure.

These programs (a software module and software) may be stored in a non-volatile memory including a random access memory and a flash memory, Read Only Memory (ROM), an Electrically Erasable Programmable Read Only Memory (EEPROM), a magnetic disc storage device, a Compact Disc-ROM (CD-ROM), Digital Versatile Discs (DVDs), or other type of optical storage device, and a magnetic cassette. Alternatively, they may be stored in a memory configured using a combination of some or all of these media. In addition, a plurality of constituent memories may be provided.

In addition, these programs may be stored in an attachable storage device capable of accessing an electronic device via a communication network such as the Internet, an Intranet, a Local Area Network (LAN), a Wide LAN (WLAN), and a Storage Area Network (SAN), and a communication network configured in combination thereof. This storage device may access the electronic device via an external port.

In addition, a separate storage device on a communication network may access a mobile electronic device.

According to the present disclosure, it is possible to measure the motion of a terminal using a motion measure sensor mounted on the terminal, and control the attribute of an application based on the measured motion, so that more intuitive and convenient user interface may be provided to a user.

In addition, according to an exemplary embodiment of the present disclosure, since the number of input keys or a touch area on the screen for controlling the attribute of an application can be minimized, the structure of a mobile communication terminal may be simplified, and accordingly a screen size may be enlarged even more within a limited size.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present disclosure should not be limited to the above-described embodiments but should be determined by not only the appended claims but also the equivalents thereof.

What is claimed is:

1. A terminal configured to control an application attribute, the terminal comprising:
an attribute mapping device including one or more integrated circuits configured to:
classify each motion direction of the terminal and each motion degree of each of the motion directions,
map each attribute type of at least one application installed in the terminal to the motion direction, and
map each level of control strength of each of the attribute types to each of the motion degrees;
a motion measurement device configured to measure a first motion of the terminal; and
a controlling device including one or more integrated circuits configured to:
identify a first attribute type of the at least one application mapped by the attribute mapping device in response to a first motion direction of the first measured motion,
identify a first level of control strength of the first attribute type mapped by the attribute mapping device in response to the first motion degree of the first motion direction, and
adjust the identified first attribute type and the identified level of control strength of the first attributed type for the at least one application, wherein the identified first level of control strength of the first attributed type is repeatedly adjusted for a time duration that the first level of control strength is identified beyond a predetermined time duration.

2. The terminal of claim 1, further comprising:
an application selecting device including one or more integrated circuits configured to select an application to execute among the at least one application.

3. The terminal of claim 1, wherein the attribute mapping device is configured to map each of the attribute types comprising at least one of a forward attribute type, a backward attribute type, a play attribute type, a pause attribute type, and a volume attribute type based on the motion direction with respect to at least one of a video player and an audio player.

4. The terminal of claim 1, wherein the attribute mapping device is configured to classify a range regarding at least one of a velocity in each motion direction, an acceleration in each motion direction, an angular velocity in each motion direction, an angular acceleration in each motion direction, an amount of change in a slope, and an amount of change in a movement distance of each motion direction, and map the control strength comprising at least one of a movement interval, a reproduction position, a volume level, a forward playing of a video player, a backward playing of a video player, a forward playing of an audio player, or a backward playing of an audio player in response to each classified range.

5. The terminal of claim 1, wherein the attribute mapping device is configured to map each of the attribute types comprising at least one of a direction change, an acceleration, and a reduced speed in response to a motion direction of the terminal, and map a control strength regarding the direction change, the acceleration, and the reduced speed in response to at least one of a velocity in a relevant motion direction, an acceleration, an angular velocity, an angular acceleration, an amount of change in a slope, and an amount of change in a movement distance with respect to a racing game application.

6. The terminal of claim 1, wherein the attribute mapping device is configured to classify each of the motion degrees for at least one of a velocity in each of the motion directions, an acceleration in each of the motion directions, an angular velocity in each of the motion directions, an angular acceleration in each of the motion directions, an amount of change in a slope, and an amount of change in a movement distance of each of the motion directions.

7. The terminal of claim 1, wherein the controlling device is configured to control each of the attribute types of the application when an attribute control of the application is activated by an attribute control device and the motion of the terminal is measured by the motion measurement device.

8. A method to control an application attribute and implemented by a terminal device including one or more integrated circuits, the method comprising:
classifying each motion direction of the terminal and each motion degree of each of the motion directions;
mapping each attribute type of at least one application installed in the terminal to each of the motion directions;
mapping each level of control strength of each of the attribute types to the motion degree;
measuring a first motion of the terminal device;
identifying a first attribute type of the at least one application mapped in response to a first motion direction of the first measured motion;
identifying a first level of control strength of the first attribute type mapped in response to the first motion degree of the first motion direction; and
adjusting the identified first attribute type and the identified level of control strength of the first attribute type for the at least one application, wherein the identified first level of control strength of the first attributed type is repeatedly adjusted for a time duration that the first level of control strength is identified beyond a predetermined time duration.

9. The method of claim 8, wherein measuring the motion of the terminal comprises:
selecting an application to execute among the at least one application; and
measuring the motion of the terminal device.

10. The method of claim 8, wherein mapping the attribute type of the at least one application comprises:
mapping each of the attribute types comprising at least one of a forward attribute type, a backward attribute type, a play attribute type, a pause attribute type, and a volume attribute type based on the motion direction of the terminal with respect to at least one of a video player and an audio player.

11. The method of claim 8, wherein mapping the control strength of the attribute type comprises:
classifying a range regarding at least one of a velocity in each motion direction, an acceleration in each motion direction, an angular velocity in each motion direction, an angular acceleration in each motion direction, an amount of change in a slope, and an amount of change in a movement distance of each motion direction; and
mapping each level of the control strengths comprising at least one of a movement interval, a reproduction position, a volume level, a forward playing of a video player, a backward playing of a video player, a forward playing of an audio player, or a backward playing of an audio player in response to each classified range.

12. The method of claim 8, wherein mapping each of the attribute types of the at least one application comprises:
mapping each of the attribute types comprising at least one of a direction change, an acceleration, and a reduced speed in response to the motion direction of the terminal device; and
wherein mapping each of the levels of control strength of each of the attribute types comprises:
mapping each of the levels of control strength regarding the direction change, the acceleration, and the reduced speed in response to at least one of a velocity in a relevant motion direction, an acceleration, an angular velocity, an angular acceleration, an amount of change in a slope, and an amount of change in a movement distance with respect to a racing game application.

13. The method of claim 8, wherein classifying the motion degree comprises:
classifying each of the motion degrees for at least one of a velocity in each of the motion directions, an acceleration in each of the motion directions, an angular velocity in each of the motion directions, an angular acceleration in each of the motion directions, an amount of change in a slope, and an amount of change in a movement distance of each of the motion directions.

14. The method of claim 8, wherein controlling the attribute of the application comprises:
controlling each of the attribute types of the application when an attribute control of the application is activated and the motion of the terminal device is measured.

15. A method to control an application attribute and implemented by an electronic device including one or more integrated circuits, the method comprising:
classifying each motion direction of the electronic device and each motion degree of each of the motion directions;
mapping each attribute type of at least one application installed in the electronic device to each of the motion directions;
mapping each level of control strength of each of the attribute types to each of the motion degrees;
measuring a first motion of the electronic device while the electronic device executes a relevant application of the at least one application;
identifying a first attribute type of the relevant application mapped in response to a first motion direction of the first measured motion;
identifying a first level of control strength of the first attribute type mapped in response to the first motion degree of the first motion direction; and
adjusting the identified first attribute type and the identified first level of control strength of the first attribute type for the relevant application, wherein the identified first level of control strength of the first attributed type is repeatedly adjusted for a time duration that the first level of control strength is identified beyond a predetermined time duration.

16. The method of claim 15, wherein each of the motions of the electronic device corresponds to the motion degree for at least one of a velocity, an acceleration, an angular velocity, an angular acceleration, an amount of change in a slope, and an amount of change in a movement distance.

17. The method of claim 15, wherein each of the application attribute types comprises at least one of a forward attribute type, a backward attribute type, a play attribute type, a pause attribute type, and a volume attribute type.

18. The method of claim 15, further comprising:
when a contact on a touch detect display of the electronic device is detected, activating an application attribute control screen.

19. The method of claim 18, further comprising:
selecting a different application attribute type based on a touch frequency.

20. The method of claim 15, wherein classifying the motion degree comprises:
classifying each of the motion degrees for at least one of a velocity in each of the motion directions, an acceleration in each of the motion directions, an angular velocity in each of the motion directions, an angular acceleration in each of the motion directions, an amount of change in a slope, and an amount of change in a movement distance of each of the motion directions.

21. An electronic device, comprising:
an attribute mapping device including one or more integrated circuits configured to:
classify each motion direction of the electronic device and each motion degree of each of the motion directions,
map each attribute type of at least one application installed in the electronic device to each of the motion directions, and
map each level of control strength of each of the attribute types to each of the motion degrees;
a motion measurement device including one or more integrated circuits configured to measure a first motion of the electronic device while the electronic device executes a relevant application of the at least one application; and
a controlling device including one or more integrated circuits configured to:
identify a first attribute type of the relevant application mapped in response to a first motion direction of the first measured motion,
identify a first level of control strength of the first attribute type mapped in response to the first motion degree of the first motion direction, and
adjust the identified first attribute type and the identified first level of control strength of the first attribute type for the relevant application, wherein the identified first level of control strength of the first attributed type is repeatedly adjusted for a time duration that the first level of control strength is identified beyond a predetermined time duration.

22. The electronic device of claim 21, wherein each of the motions of the electronic device corresponds to each of the motion degrees for at least one of a velocity, an acceleration, an angular velocity, an angular acceleration, an amount of change in a slope, and an amount of change in a movement distance.

23. The electronic device of claim 21, wherein each of the application attribute types comprises at least one of a forward attribute type, a backward attribute type, a play attribute type, a pause attribute type, and a volume attribute type.

24. The electronic device of claim 21, wherein the electronic device is further configured to activate an application attribute control screen when a contact on a touch detect display of the electronic device is detected.

25. The electronic device of claim 21, wherein the electronic device is further configured to select a different application attribute type based on a touch frequency.

26. The electronic device of claim 21, wherein the attribute mapping device is configured to classify each of the motion degrees for at least one of a velocity in each of the motion directions, an acceleration in each of the motion directions, an angular velocity in each of the motion directions, an angular acceleration in each of the motion directions, an amount of change in a slope, and an amount of change in a movement distance of each of the motion directions.

* * * * *